(12) United States Patent
Smaglinski (10) Patent No.: US 7,068,880 B2
(45) Date of Patent: Jun. 27, 2006

(54) COUPLING DEVICE AND METHOD FOR MANUFACTURE THEREOF

(75) Inventor: Ingo Smaglinski, Mainz (DE)

(73) Assignee: Cube Optics AG, Mainz (DE)

( * ) Notice: Subject to any disclaimer, the term of this patent is extended or adjusted under 35 U.S.C. 154(b) by 109 days.

(21) Appl. No.: 10/363,600

(22) PCT Filed: Aug. 29, 2001

(86) PCT No.: PCT/DE01/03394

§ 371 (c)(1),
(2), (4) Date: Mar. 4, 2003

(87) PCT Pub. No.: WO02/21171

PCT Pub. Date: Mar. 14, 2002

(65) Prior Publication Data

US 2003/0185506 A1  Oct. 2, 2003

(30) Foreign Application Priority Data

Sep. 5, 2000   (DE)   ................................. 100 43 996

(51) Int. Cl.
*G02B 6/26* (2006.01)
*G02B 6/42* (2006.01)
(52) U.S. Cl. .............................. 385/31; 385/15; 385/47
(58) Field of Classification Search ............... 264/1.25; 425/175; 385/15, 31, 39, 77, 88, 139, 47
See application file for complete search history.

(56) References Cited

U.S. PATENT DOCUMENTS

| | | | | |
|---|---|---|---|---|
| 4,611,884 A | * | 9/1986 | Roberts | ........................ 385/44 |
| 5,349,180 A | * | 9/1994 | Vaughan | ................... 250/227.2 |
| 5,416,867 A | | 5/1995 | Thorsten et al. | ............. 424/450 |
| 5,420,946 A | * | 5/1995 | Tsai | ............................. 385/22 |
| 5,710,854 A | * | 1/1998 | Myers et al. | ................ 385/132 |
| 6,075,913 A | * | 6/2000 | Cohen et al. | ................... 385/47 |
| 6,156,243 A | * | 12/2000 | Kosuga et al. | ................ 264/2.5 |
| 6,157,025 A | | 12/2000 | Katagiri et al. | ............. 250/226 |
| 6,516,115 B1 | * | 2/2003 | Fujita et al. | ................... 385/31 |
| 6,563,977 B1 | * | 5/2003 | Chen et al. | .................... 385/24 |
| 6,616,287 B1 | * | 9/2003 | Sekita et al. | ................. 359/858 |
| 6,832,031 B1 | * | 12/2004 | Smaglinski | ................... 385/47 |
| 6,985,658 B1 | * | 1/2006 | Smaglinski | ................... 385/47 |

FOREIGN PATENT DOCUMENTS

| | | |
|---|---|---|
| DE | 40 08 483 A1 | 9/1991 |
| DE | 4008483 A1 * | 9/1991 |
| DE | 694 26 667 T2 | 7/1995 |
| DE | 44 23 187 A1 | 12/1995 |
| EP | 0 807 981 A2 | 11/1997 |

(Continued)

*Primary Examiner*—Brian Healy
*Assistant Examiner*—Derek L. Dupuis
(74) *Attorney, Agent, or Firm*—Paul and Paul (57) ABSTRACT

A coupling device for the coupling in and/or the coupling out of electromagnetic waves, into and respectively out of a transmitting or receiving element, for example, from an optical wave guide, with a reflecting surface (8). In order to provide the coupling device to permit the routing and the imaging of light in the most confined of spaces with as little loss as possible, it is proposed that the reflecting surface (8) is curved, and at the same time, the coupling device is easy to align and inexpensive to manufacture. Included is a method for manufacturing the coupling device, wherein the reflecting surface (8) is manufactured as part of a surface of revolution with a conic section as the generating profile curve.

8 Claims, 11 Drawing Sheets

FOREIGN PATENT DOCUMENTS

| | | |
|---|---|---|
| EP | 0 938 005 A2 | 8/1999 |
| EP | 1 059 712 A2 | 12/2000 |
| GB | 2 162 335 A | 1/1986 |
| GB | 2162335 A * | 1/1986 |

* cited by examiner

COUPLING DEVICE AND METHOD FOR MANUFACTURE THEREOF

BACKGROUND OF THE INVENTION

The present invention relates to a coupling device with a reflecting surface for the coupling into and/or coupling out of electromagnetic waves into and/or respectively out of, for example, optical wave guides, and a method for manufacture thereof.

The present invention relates to a coupling device with a reflecting surface for the coupling into and/or coupling out of electromagnetic waves into and/or respectively out of, for example, optical wave guides, and a method for manufacture thereof.

In particular in telecommunications and data communications, it has become usual to transmit information optically, that is to say, for example, via optical guides. Optical guides are rods or thin fibres of highly transparent optical materials that transmit light by means of multiple total internal reflection along their longitudinal direction. The light generally entering via a flat and/or respectively polished input surface follows all the bends of the fibre, and in the end emerges once more from an again generally polished end surface. After suitable modulation, the electrical signals that have to be transmitted are converted by means of an electro-optical converter into light signals—mostly in the infra-red range, are coupled into the optical wave guide, transmitted by the optical wave guide, and in the end converted back into electrical signals by means of an opto-electrical converter. In order to increase the rate of transmission of the optical wave guides, it has become usual to transmit several different communication signals simultaneously via one optical wave guide. For this, the communication signals are modulated. Different carrier frequencies are used respectively for the different communication signals, so that the individual signals can also be described as wave-coded signals. After transmission of the individual communication signals via the optical wave guide, the individual signals have to be separated and demodulated.

Devices are thus known in this technical field for adding and selecting wavelength-coded signals (light of a specific wavelength or specific wavelengths). Such devices employ optical fibres that have a high information carrying density. The purpose of the devices is to separate out appropriate information or respectively an appropriate wavelength from the large amount of information transmitted. Narrow band filters, for example, can be used for this separation, which allow certain light frequencies to pass almost unhindered, while selected frequencies are reflected. When the light emerges the glass fibre, however, there is inevitably expansion of the beam, which leads either to the intensity at the imaging point, that is to say the point at which the filtered light is plotted, being significantly reduced, or the use of appropriate lens systems, for example, gradient refractive index lenses (GRIN lenses) being necessary in order to collimate the light onto the appropriate imaging point.

The embodiment with the lenses has the disadvantage, however, that it is on the one hand very expensive, on the other hand very accurate alignment is necessary, and moreover, the imaging characteristics are still wavelength-dependent. Alignment has most often to be undertaken in a complex manner by hand, as the core diameter, for example, of the single-mode optical fibres, is only approximately 9 μm. There is therefore a need for a coupling device without the disadvantages described.

The inherent characteristic of glass fibres is that they cannot be routed or respectively bent in any manner required. It is not possible, for example, to bend glass fibres with a radius smaller than approximately 20 to 30 mm, as losses then become too great as in part the criteria for total internal reflection are no longer satisfied. Furthermore, if the curvature is too great, cracks and stresses can form within the material. Appropriately large routing loops must therefore be set out that do, however, take up a significant amount of space in the optical apparatuses. There is also a need for a possibility for routing the optical information flow in the most confined space possible

SUMMARY OF THE INVENTION

The object of the present invention is therefore to provide a coupling device of the type described that permits routing and imaging of light in the most confined of spaces possible with as low loss as possible, wherein at the same time the coupling device is to be simple to align and inexpensive to manufacture.

This object is solved in accordance with the invention in that a reflecting surface is used for coupling, and said surface is curved. By means of the curvature, the beam expansion occurring at the end of a glass fibre is at least partly compensated for by the curved surface.

An embodiment is particularly preferred in which a section through the curved surface corresponds approximately to a section of a parabola, a hyperbola or an ellipse. In other words, all curves of the second order of planes, which are often also described as conic sections are, apart from a straight one, particularly suitable as a profile for the curved surface. The reflecting surface is curved such that it follows a section of an imaginary curve of the second order of planes. These shapes have particularly good imaging characteristics, so they are particularly suitable for use in a coupling device. For example, thus, a beam expanding in the focal point of an ellipse, which is reflected on the ellipse, is imaged in the other focal point of the ellipse. The total amount of light emerging at the first focal point is consequently available almost in a point form at the other focal point.

A particularly advantageous embodiment provides that the reflecting surface has approximately the shape of a section of a paraboloid of revolution, an ellipsoid of revolution, or a hyperboloid of revolution. In other words, the reflecting surface at least in part follows the external surface of a body of revolution. The result is that a section through the reflecting surface along a section surface perpendicular to the axis of rotation has an approximately circular sectional shape, while a section along a plane that lies in the axis of rotation has approximately the shape of a section of a parabola, hyperbola or ellipse. Such a curved reflecting surface has particularly suitable imaging characteristics so that losses occurring because of the coupling out and coupling in are very small, and the use of a collimating optical system is unnecessary.

Light from a transmitting element can, for example, be orientated towards the coupling device, or respectively, the curved reflecting surface, such that the coupling device deflects the light in the most confined space by a certain angle such that the deflected light can, for example, be coupled into an appropriate receiving unit. Deflection of the light by up to 90° and more is easily possible in the most confined space of a few millimetres and less, by means of the coupling device according to the invention.

At least one transmitting or receiving element is arranged in the proximity of a focal point of the reflecting surface. A transmitting or receiving element is understood to be all light processing systems such as, for example, (the ends of) glass fibres and optical wave guides, and imaging systems such as, for example, lenses, gradient index structures or mirror optical systems, and also light-emitting structures such as, for example, LEDs or lasers, or light-receiving structures such as, for example, electro-optical converters or photo-diodes. The focal points of the curved surfaces correspond to the imaging points of the imaginary hyperbola, parabola or ellipse that the reflecting surface follows.

A parabola is thus defined, for example, as the number of points that are equidistant from a fixed point, the so-called imaging point, and a fixed straight line, the so-called directrix. In an analogous manner, the hyperbola is defined as the number of all points for which difference in the distances apart of two given fixed points, the so-called focal points, is constant. Lastly, the ellipse is defined as the number of all points for which the sum of the distances apart of two given fixed points, the so-called focal points, is constant.

If, for example, the profile of the curved, reflecting surface follows the shape of an imaginary parabola, and if the end of a transmitting element, for example, a glass fibre, is arranged in the proximity of the focal point of the imaginary parabola, the light beams emerging from the glass fibres are reflected on the parabolic curved surface such that the reflecting light beams are substantially parallel to one another.

If, on the other hand, the curved surface has the shape of an imaginary ellipse, the light beams emerging from the glass fibres are reflected on the curved surface such that they are focused in the other focal point of the imaginary ellipse.

In order to facilitate the alignment of, for example, a glass fibre in the proximity of the focal point of the curved surface, a particularly advantageous embodiment is provided with at least one locating pad for aligning a transmitting or receiving element. This locating pad can be effected, for example, by a planar surface that is arranged at a distance from the focal point of the curved surface that corresponds approximately to the radius of the fibre. The glass fibre must consequently be simply placed on the planar surface in order to obtain precise alignment of the glass fibre in one direction.

Embodiments are preferred, however, in which the locating pad permits alignment in at least two directions, or particularly preferably in three directions.

An embodiment of the coupling device is thus particularly advantageous in which the locating pad is configured in a single piece with the reflecting surface. By means of the single piece construction, alignment of the locating pad with respect to the reflecting surface is unnecessary. Instead, during manufacture care must simply be taken to provide an appropriately accurate arrangement of the locating pad.

The present invention also relates to a method for manufacture of a coupling device. It is thus also the object of the present invention to provide a method that permits inexpensive manufacturing of the coupling device with a high degree of accuracy.

This object is solved in accordance with the invention in that the coupling device is fabricated, at least along one section, as a body of revolution that in profile follows a conic section. This has the advantage that the curved surface can preferably be manufactured from solid material, for example, by means of turning or milling. By turning or milling, highly accurate configuration of the reflecting surface is possible. Clearly, the curved surface can also be approximated by means of small, planar surfaces that fit together in the manner of facets.

Clearly, the material can be of almost any kind. In this instance copper or glass, possibly also silicon or another material with high thermal conductivity and low expansion coefficients, is particularly preferred for use.

Even when the material is preferably selected such that reflection for the desired wave range occurs in the reflecting surface area, it is also clearly possible to fabricate the coupling device from transparent material and to vapour deposit a reflecting layer, for example, a metallic layer, in the reflecting area. According to the application, it can be advantageous when the reflecting surface is coated and/or polished.

A particularly advantageous embodiment provides that in the same restraint in which the reflecting surface (or respectively the negative shape or original shape thereof) is turned, a locating surface is turned, perpendicular to the axis of rotation of the reflecting surface. This locating surface serves for the alignment of the transmitting or receiving element in the proximity of a focal point. In this case also, the configuration of the reflecting surface and locating surface is not only time-saving but also leads to a highly accurate relative positioning of the locating surface in relation to the reflecting surface. The accuracy of the coupling device is thus substantially determined by the quality of the turning tool and the positioning apparatus of the turning machine. The generally manual alignment of the turning tool in the tool holder and of the workpiece in the workpiece holder need not, on the other hand, be done precisely as it is not absolute accuracy that matters in the manufacture of the coupling device, but simply the exact positioning of the locating surface relative to the reflecting surface.

Using the method described, the coupling device can be easily manufactured in accordance with the invention.

For many applications, in particular for manufacturing large numbers of items, it can, however, be advantageous when a negative shape of the turned or milled part is fabricated and the coupling device manufactured by subsequent moulding. Firstly, this has the advantage that the time-consuming turning or milling procedure only has to be done once. Thereafter, with the aid of the mould, any number of coupling devices can, in principle, be manufactured. Further, moulding has the advantage that the choice of materials for manufacturing the coupling device is significantly increased. Using the moulding technique, consideration no longer has to be taken of the turning procedure. It is possible, for example, to fabricate the coupling device from, for example, plastics or glass, by means of injection moulding, hot stamping, hot pressing or casting.

Clearly, the negative shape can also be manufactured directly as a turned or a milled part.

A particularly advantageous embodiment provides that prior to moulding an area of the negative shape is disced away so that the moulded positive has at least one further locating pad. Because the at least one further locating pad is formed on the negative shape, the manufacturing of the at least one further locating pad is simplified. If it were desired to fit the further locating pad on the turned or milled part, it would have to be welded or screwed on, as because of the fabrication of the first locating pad by means of turning or milling, all the material that could be used for the further locating pad has necessarily been removed.

Clearly, for example in the case of the embodiment with an ellipse-shaped reflecting surface, locating pads can also be provided in the proximity of both focal points.

BRIEF DESCRIPTION OF THE DRAWINGS

Further advantages, features and possibilities for application of the present invention will become evident with reference to the following description of preferred embodiments and the attached drawings. In these is shown in.

DETAILED DESCRIPTION OF THE INVENTION

Figure 1A:
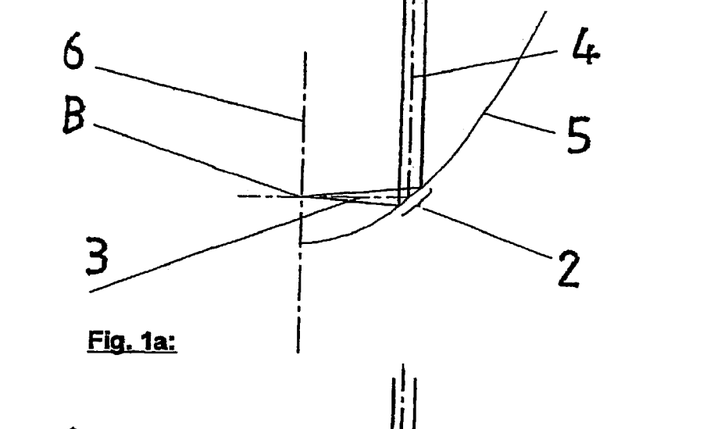
FIGS. 1a–d a first embodiment of the coupling device according to the invention in a schematic view, a sectional view, a side view, and a perspective view, FIGS. 2a–d a second embodiment of the coupling device according to the invention in a schematic view, a sectional view, a side view, and a perspective view, FIGS. 3a–d a third embodiment of the coupling device according to the invention in a schematic view, a sectional view, a side view, and a perspective view, FIGS. 4a and b a fourth embodiment of the coupling device in two perspective views, FIGS. 5a–d a fifth embodiment of the coupling device according to the invention in a schematic view, a sectional view and two perspective views, and FIGS. 6a–d an exemplary sequence of a method for manufacturing a coupling device.
Figure 1B:
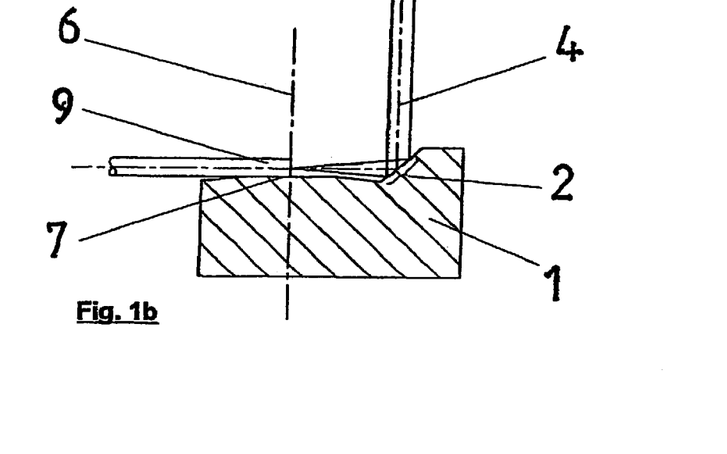
Figure 1C:
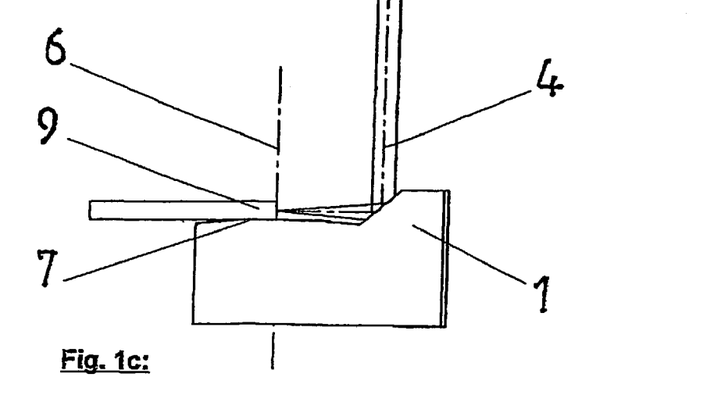

In FIGS. 1a to d a first embodiment of the coupling device according to the invention is shown, Firstly in FIG. 1 the routing principle is demonstrated schematically. A reflecting surface 2 follows in its profile the shape of a parabola 5, and perpendicular to the plane of the parabola 5 the curvature of the surface 2 is circular as it forms the section of the surface of a body of revolution. A light beam 3 that occurred on the reflecting surface 2 expands at the focal point B of the parabola and leaves the coupling device as a reflected beam 4. It is clear that the beams emerging from the focal point B are imaged to infinity by the coupling device. In the arrangement shown here, the angle between the incoming light beam 3 and the outgoing light beam 4 is approximately 90°. In FIGS. 1b and 1c a sectional and a side view are shown respectively of the first embodiment. The coupling device is composed of a base body 1 that has a reflecting surface 2. Furthermore, a locating surface 7 is provided that serves to receive a glass fibre. If the glass fibre 9 is placed on the locating surface 7 such that it terminates in the axis of symmetry of the parabola 5, provided there is suitable arrangement of the locating surface 7, the end surface of the fibre 9 lies approximately at the focal point B.

Figure 1D:
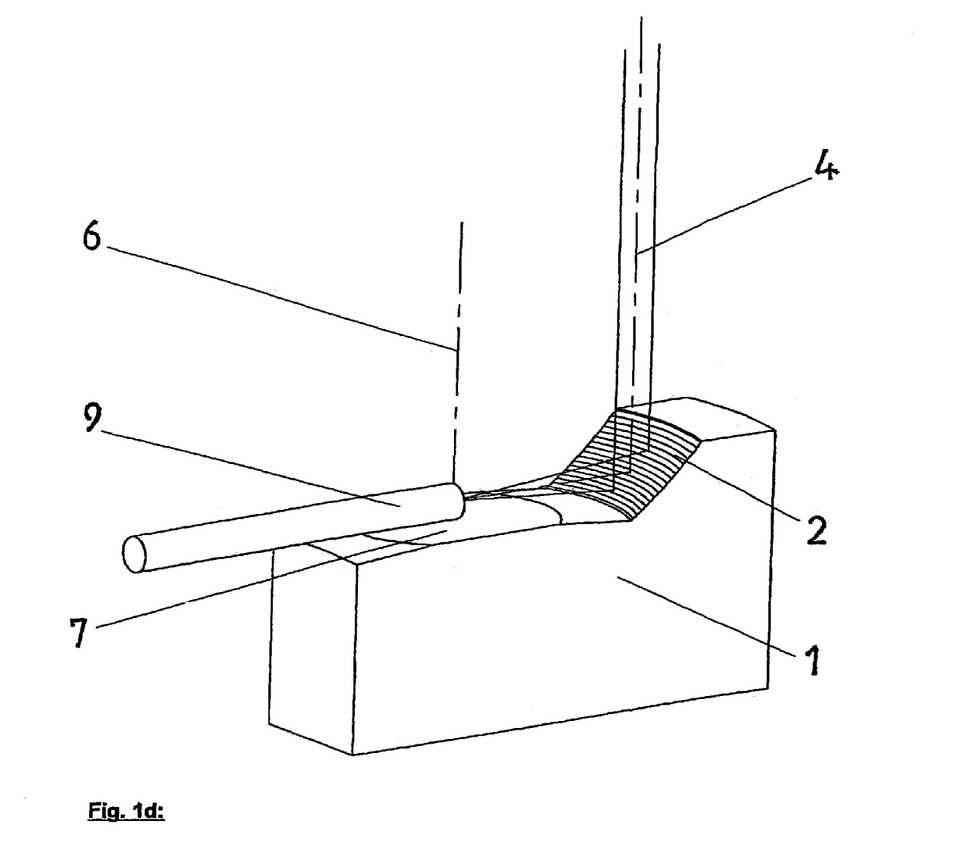
Figure 2A:
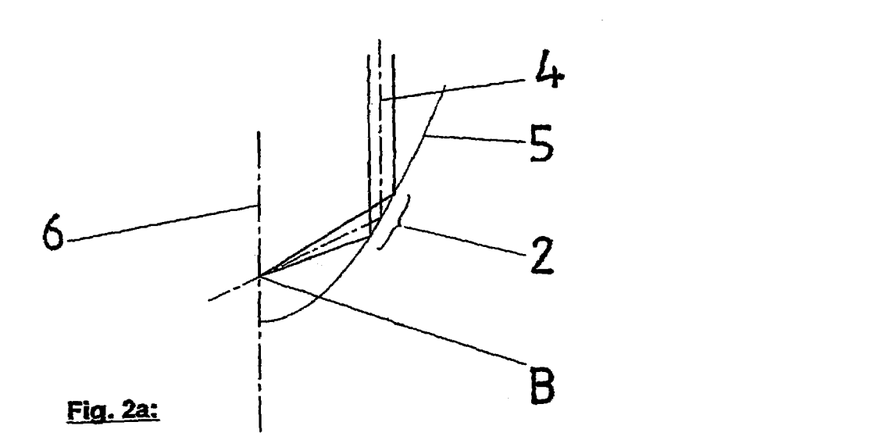
Figure 2B:
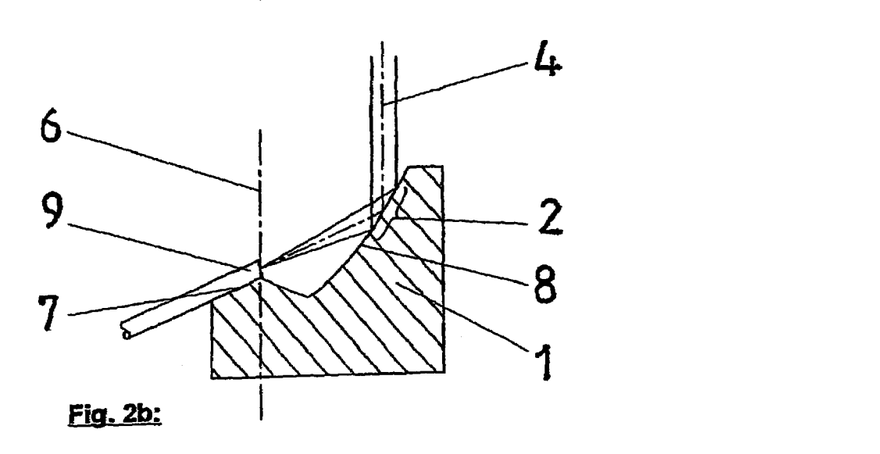
Figure 2C:
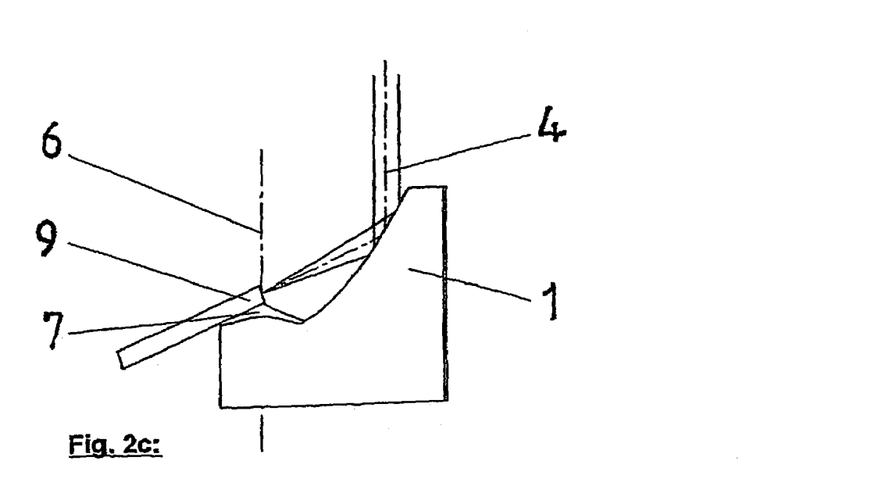
Figure 2D:
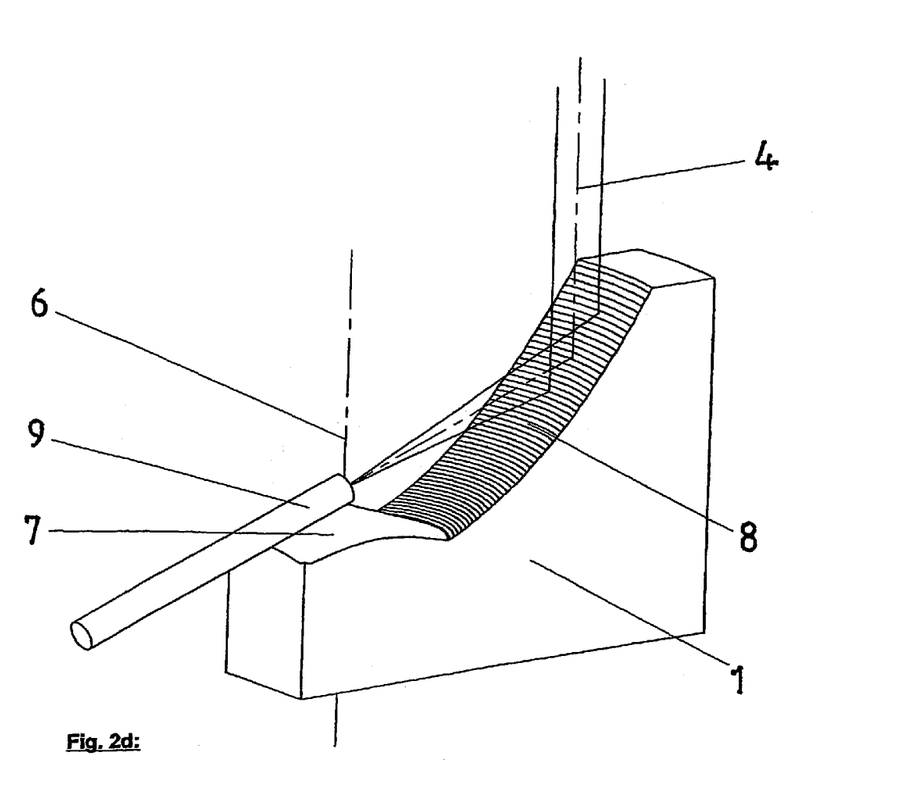
Figure 3A:
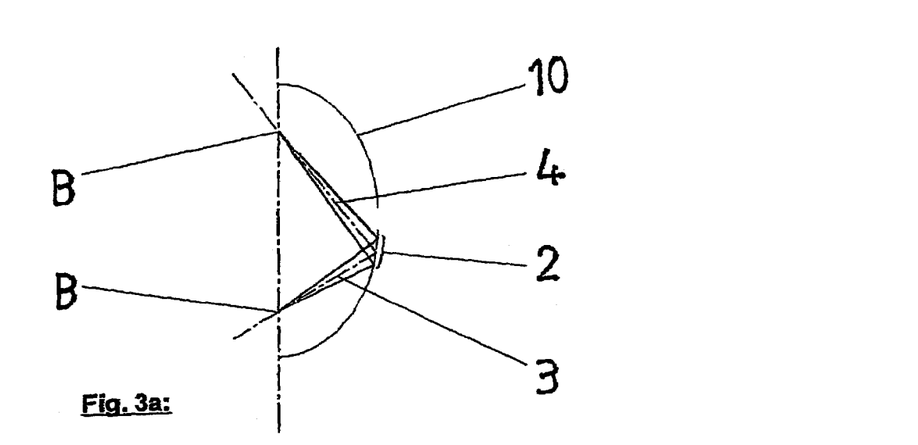
Figure 3B:
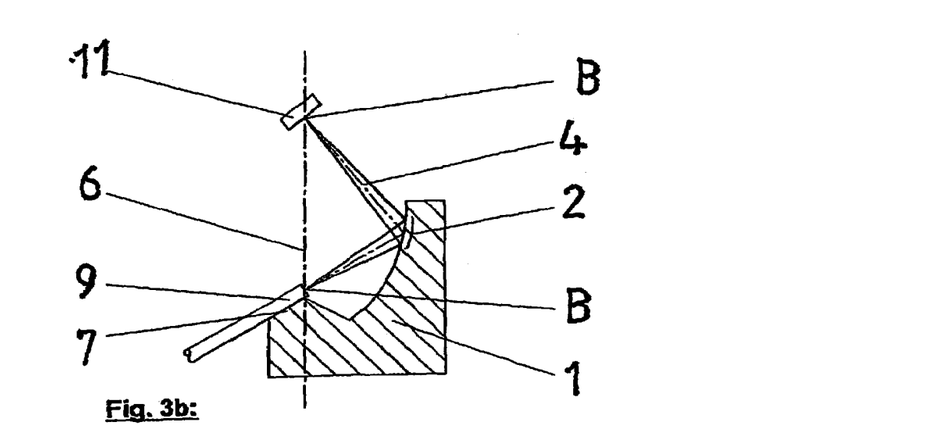
Figure 3C:
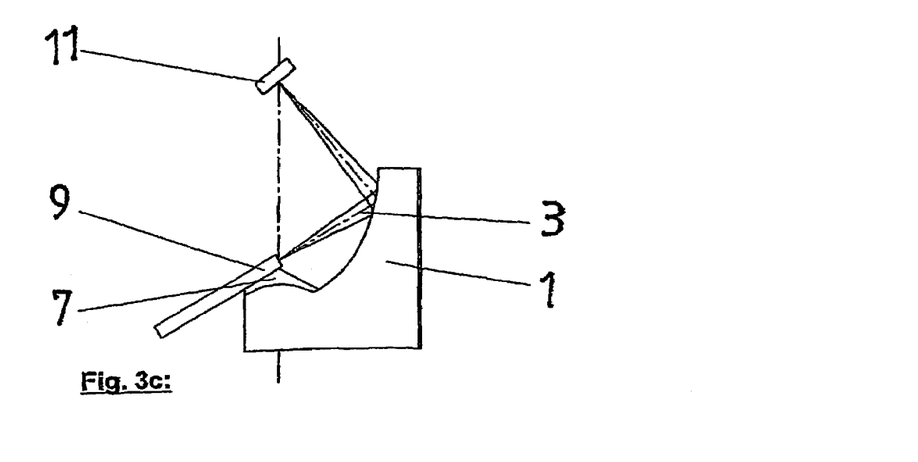
Figure 3D:
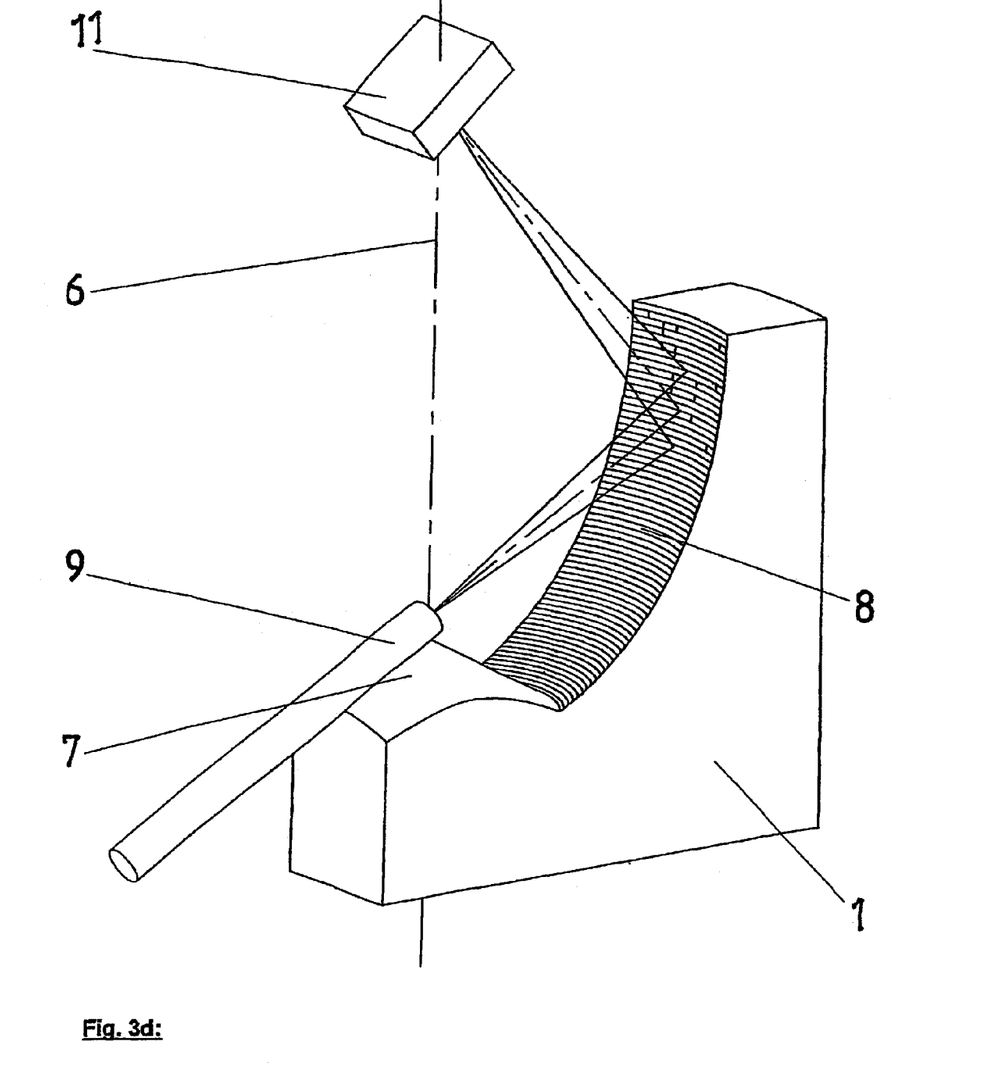

FIG. 1d shows a perspective view. It is evident that the reflecting surface 2 follows the shape of a paraboloid of revolution. By means of the coupling device shown here, light that by means of the glass fibre 9 emerges divergent at the end of the glass fibre, is deflected by approximately 90° on the reflecting surface 2, and then travels approximately parallel. Clearly, the parallel characteristics of the reflected light beam 4 are better the more accurately the fibre end surfaces of the glass fibre is arranged at the focal point B. In order to make possible the best possible positioning without complex alignment procedures, a locating surface 7 is provided that is arranged such that when put into place on the locating surface 7, the fibre end surface of the glass fibre 9 is exactly at the height of the focal point B. By displacing the glass fibre 9 on the locating surface 7, the fibre end surface now simply has to be positioned such that it lies approximately in the axis of rotation 6 of the paraboloid of revolution of the reflecting surface 2.

In the second embodiment shown in FIGS. 2a to 2d it is clear that the divergent light beam emerging from the glass fibre 9 does not necessarily have to be perpendicular to the axis of rotation 6, but can, for example, be tilted. It is simply important that the divergent light beam emerges approximately from the focal point B of the parabola. It is unimportant where the point of incidence 2 of the beam 3 to be reflected occurs on the reflecting surface 8.

Advantageously, the coupling device according to the invention is used in an "off-axis" orientation, that is to say the light beam emergent from the glass fibre or another transmitting element does not lie on the axis of rotation 6.

It should be emphasised at this point that with all the embodiments shown, the beam path can be set up the other way around. It is possible, for example, to couple in light into an end surface of the glass fibre 9 arranged in the proximity of the focal point, which light is incident parallel to the axis of rotation 6 on the reflecting surface 8.

The embodiment of FIGS. 2a to d makes it clear that the angle between the fibre axis, or respectively the light beam 3 to be reflected and the reflected light 4, can also be more than 90°. It is thus possible, according to the application, to obtain almost any angle. Deflection of the light in the most confined space is possible in this way.

In FIGS. 3a to d, a third embodiment of the coupling device according to the invention is shown. As is clear from the schematic sketch of FIG. 3a, in this case the reflecting surface 2 follows the shape of an ellipse 10. The result is that light from one focal point B of the ellipse that is divergently incident on the reflecting surface 2 is imaged in the other focal point B. This embodiment is thus particularly suitable for coupling light from one glass fibre end into the end of another glass fibre. With this, the end surfaces of the respective glass fibres have simply to be arranged in the focal points B of the ellipse. Naturally, it is not absolutely necessary for glass fibres 9 to be arranged in the two focal points B, but, for example, LEDs or photo-elements could also be arranged there. By means of the coupling device according to the invention, coupling between two separate light conducting elements can easily take place.

Figure 4A:
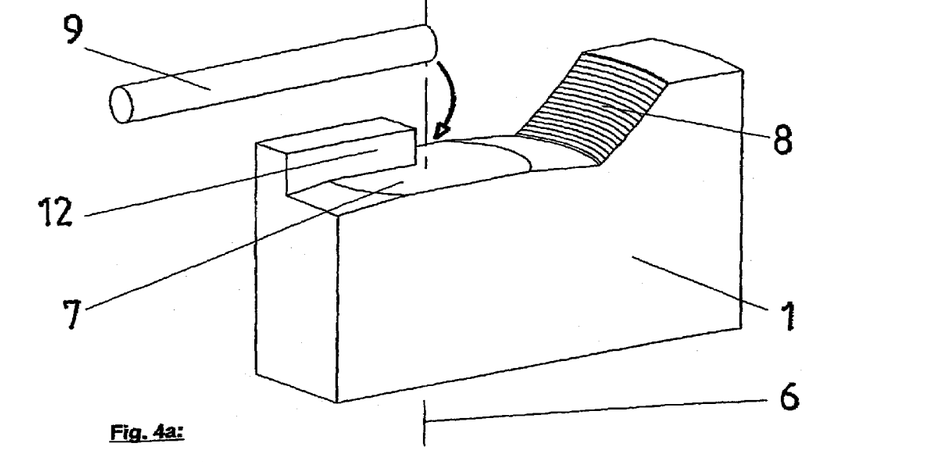
Figure 4B:
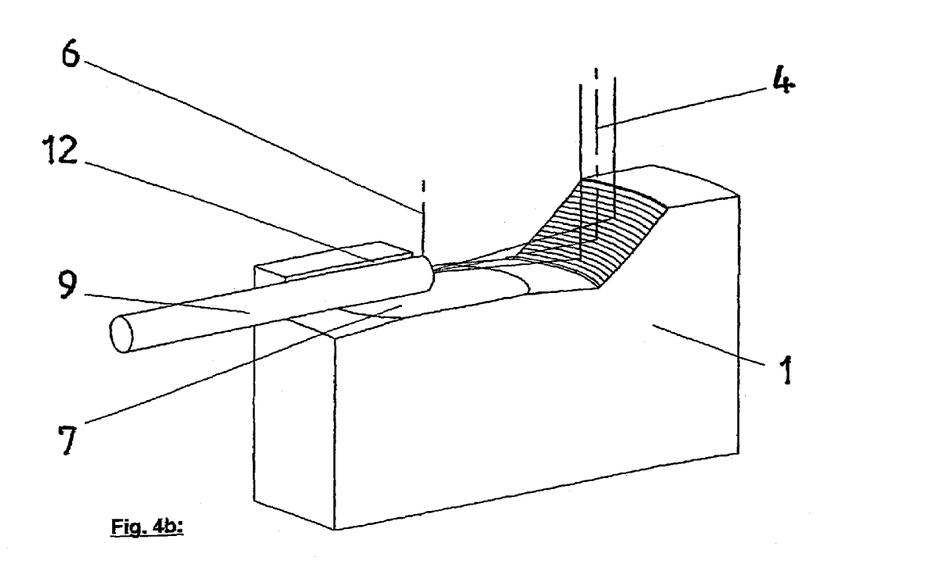
Figure 5A:
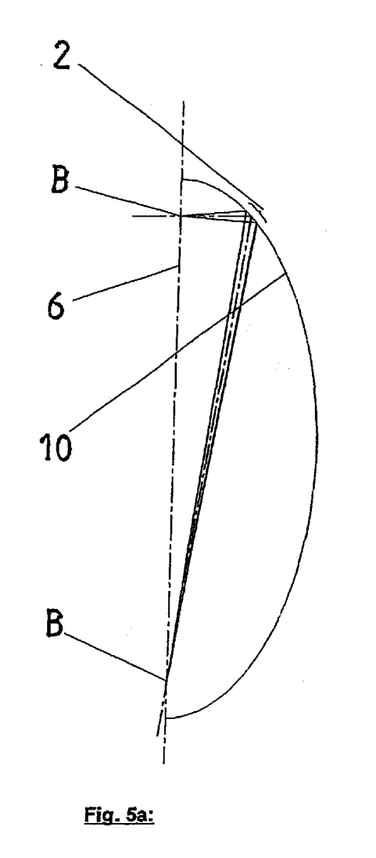
Figure 5B:
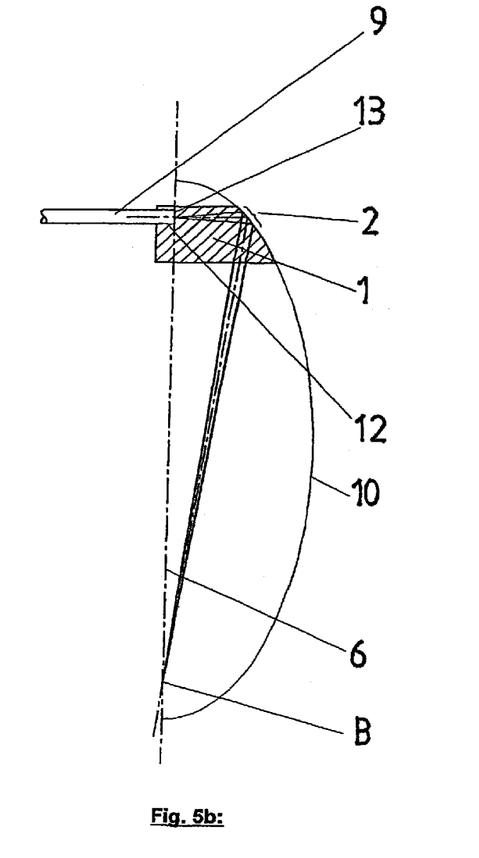
Figures 5C, 5D:
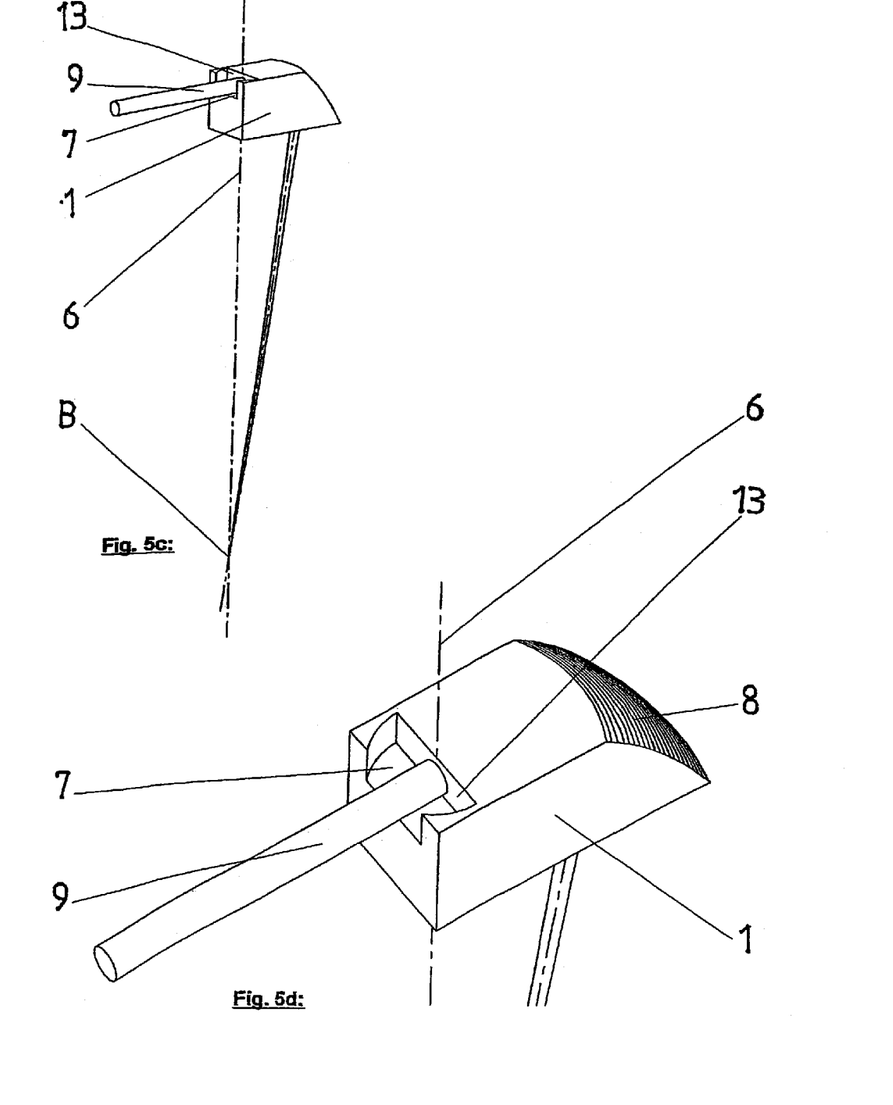

As described hereinabove, a locating surface 7 for exact positioning of the glass fibre in the direction of the axis of rotation 6 is provided. As shown in FIGS. 4a and 4b by an arrow, the glass fibre 9 has simply to be placed on the locating surface 7 in order to obtain alignment of the glass fibre in the direction of the axis of rotation 6. In the embodiment shown in FIGS. 4a and b, a further locating pad 12 is provided that allows alignment of the fibre in the direction of a line that runs perpendicular to the fibre axis and perpendicular to the axis of rotation 6. By means of the locating surface 12, alignment has once again been significantly simplified. Complex alignment is not necessary, as the glass fibre 9 has simply to be placed on the two locating surfaces 7, 12. Alignment or respectively positioning takes place only in the direction of the fibre axis. It has been shown that in this direction, there is generally a substantially greater amount of tolerance than in the other two directions. This alignment can, for example, take place with the aid of an optical marking on the base body 1. As the coupling device according to the invention is not dependent upon wavelength, alignment can also be undertaken using visible light in cases where signal transmission using non-visible light is planned. The course of the beam can be followed visually by the person doing the alignment and alignment is easily possible. If the coupling device is then operated with light of other wavelengths, no realignment is necessary. With the known coupling arrangements with two GRIN lenses and one mirror, on the other hand, alignment must inevitably be matched with the wavelength, so generally visual alignment is not possible.

Naturally, it is also possible to provide a third locating pad that, for example, extends approximately perpendicular from the second locating surface 12 and, for example, form a kind of stub so that for accurate positioning, the glass fibre 9 is firstly brought into contact with the locating surfaces 7 and 12, and then the glass fibre 9 is moved in the direction of the reflecting surface 8 until the glass fibre end surface touches the third locating surface, said locating surface having the shape of a flat step. Care must be taken that, to the extent that it is not transparent, the locating pad must not cover the light conducting core of the fibre end surface.

In FIGS. 5a to d, a fifth embodiment is shown in which the reflection takes place within a transparent base body 1 because of total internal reflection at the transition between the optically thicker and optically thinner medium. The reflection principle is shown schematically in FIG. 5a and substantially corresponds to FIG. 3a. The light emergent from the fibre end surface of the glass fibre 9 enters the transparent base body 1 at the focal point B. The light passes within the base body 1 until it is incident upon the curved external surface 2. Because of the transition between the optically thicker and the optically thinner medium, total internal reflection takes place here. The reflected light beam lastly emerges at an angle from the base body 1 at which no total internal reflection takes place.

With this embodiment too, the light outgoing at one focal point B from the glass fibre 9 is imaged in the other focal point B. It can be clearly seen that in this case too, several locating pads are present. Thus, for example, the locating surface 7 is provided so that the glass fibre 9 serves as a positioning locating pad in the direction of the axis of rotation 6. A locating pad 13 is provided in the direction of the fibre axis.

Figure 6A:
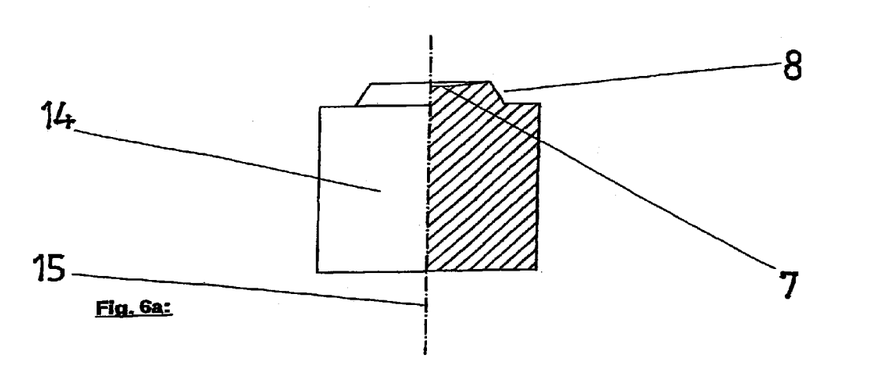

An exemplary method sequence for manufacturing a coupling device according to the invention is shown in FIGS. 6a to 6d. FIG. 6a shows that firstly a body of revolution 14 is manufactured that is rotationally symmetrical with respect to the axis of rotation 15. The body shown already has a surface 8 that, in the example shown, follows a paraboloid of revolution. Furthermore, the locating surface 7 can already be seen. The body illustrated is manufactured by turning. The curved surface 8 and the locating surface 7 are thus fabricated in the same tooling restraint, so the relative arrangement of the locating surface 7 with respect to the surface 8 is highly accurate.

Figure 6B:
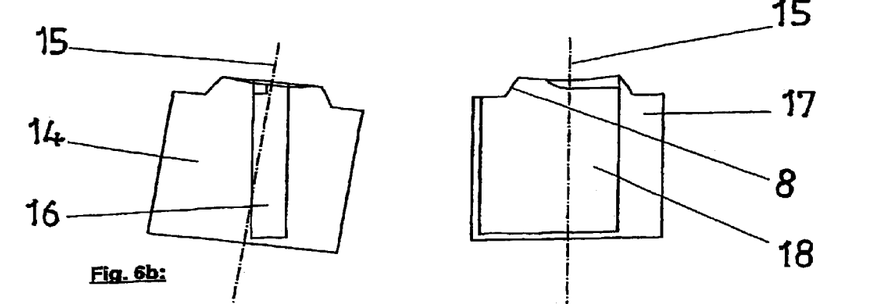
Figure 6C:
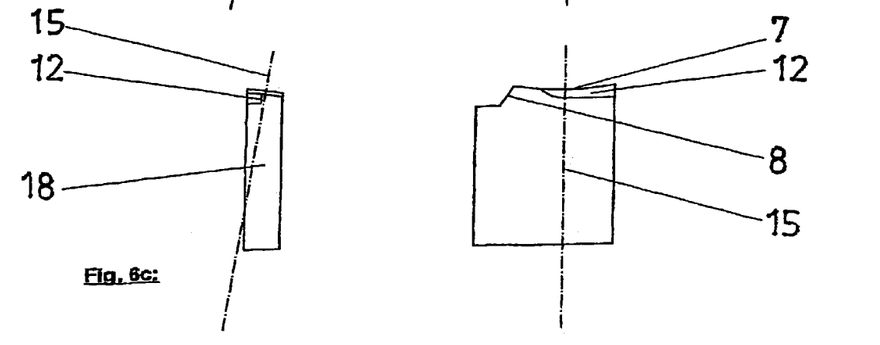

In the next step, as shown in FIGS. 6b and 6c, a disc 16 is cut out of the body of revolution 16, which does not necessarily have to be orientated parallel to the axis of rotation. This disc 16 that is shown in a sectional view in the right-hand drawing of FIG. 6b also has a curved surface 8. In order to manufacture the coupling device with the least possible external dimensions, the section 17 can now also be removed.

Alternatively to this, firstly a disc or a small plate can be manufactured, which is then provided with the curved surface 8 by means of turning or milling. This variation to the method has the advantage that after turning or milling the curved surface 8, no further method steps are necessary, so the danger of subsequently damaging the quality of the curved surface is minimized.

It should be stated at this point that it is also possible to "cut out" a large number of coupling devices from the body of revolution. However, the positioning locating pad must possibly be made as a separate part.

To the extent that the body of revolution has been manufactured from transparent material, the existing part shown in FIG. 6c can be used as a coupling device analogous to the embodiment shown in FIGS. 5a to 5d.

Alternatively to this, the part 18 can serve as a moulding tool. If necessary, additional material can be removed so that in the moulding part a second locating pad 12 is formed.

Figure 6D:
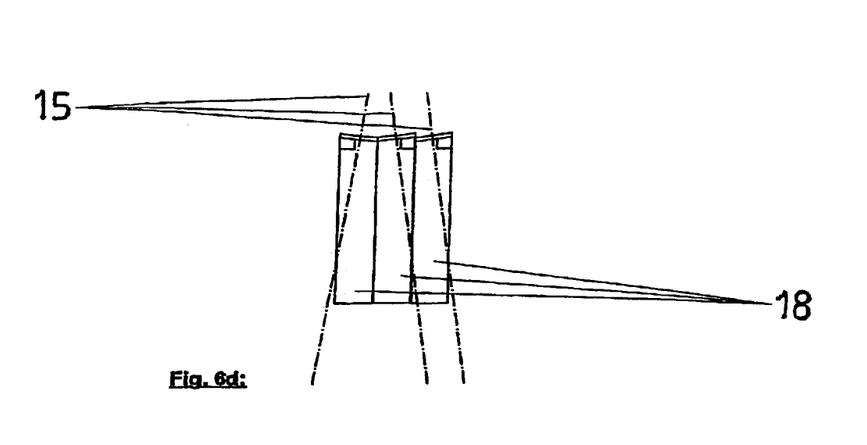

In FIG. 6d an arrangement of several moulding tools 18, 18', 18" lined up next to one another is shown. By moulding, in the example shown three different coupling devices are formed. The axes of rotation 15, 15', 15" of the moulding tool can be tilted towards one another.

In the preferred embodiment, in no direction does the coupling device measure more than 5 mm, and can be manufactured significantly smaller.

By means of the coupling device according to the invention, it is now possible to route the light path in the most confined space by reflection at an angle. In particular in optical telecommunications and data communications, this leads to a significantly more compact design for the apparatus used.

It is thus possible, for example, to route several glass fibres coming in from different directions using coupling devices such that they are routed in the individual optical guides of a small plug.

In contrast to spherical lens systems or GRIN lenses, the coupling device according to the invention shows no imaging errors. Moreover, only one optical surface is required, so fabrication is cheaper and at the same time the otherwise inconvenient increased tolerance is avoided.

The elements of the coupling device according to the invention can advantageously be arranged such that during injection moulding, hot stamping and so forth, un-moulding can be done in a single direction so that a simple tool can find application. This results in a substantially more simple and cheaper moulding tool.

In contrast to this, for example with bi-convex lenses, not only must the two optical surfaces themselves be very accurately fabricated, they must moreover be positioned very accurately relative to one another. Thus it is possible using the method according to the invention to manufacture coupling device, for example, by moulding. Because in contrast to lenses accurate orientation of two opposite surface to one another is unnecessary, moulding is possible without needing a great deal of alignment.

Rather than with conventional deflection methods with GRIN lenses, with the coupling device according to the invention, no material is necessary in the beam path, so the absorption loss is significantly lower.

The coupling device can be fabricated from almost any material at all. The material must neither be transparent nor of special optical purity. In this way, it is cheaper to manufacture, and additionally by suitable choice of materials, for example, susceptibility to large variations in temperature is minimised.

A further advantage of the coupling device according to the invention is that the imaging takes place absolutely independently of wavelength. In other words, the coupling device is useable for a very wide wavelength range. Moreover, for simple, optimum alignment of the transmitting and receiving elements it is possible, for example, to effect coupling with another wavelength, for example with visible light. Because the beam path is visible to the person doing the alignment said alignment can be done easily. After successful alignment, light of completely different wavelengths can naturally be reflected with the coupling device without realignment being necessary.

The coupling device can be made very small. The reflecting surface can be reduced to a surface of a few square millimetres so that it is possible to arrange a whole series of coupling devices parallel to one another in the most confined of spaces. In essence, by means of the locating surfaces according to the invention, the fibre or respectively the transmitting and receiving element can be mounted with very little alignment, or even none at all. With suitable choice of the locating surfaces, the mounting of the fibre on the coupling device can also be automated inexpensively.

LIST OF DESIGNATIONS (1) Base body
(2) active reflecting surface
(3) incident light beam
(4) emergent light beam
(5) parabola
(6) axis of rotation
(7) first locating surface
(8) reflecting surface
(9) transmitting or receiving element
(10) ellipse
(11) transmitting or receiving element
(12) second locating surface
(13) third locating surface
(14) body of revolution
(15) axis of rotation of the body of revolution
(16) disc
(17) section
(18) moulding tool
(B) focal point

The invention claimed is:

1. Coupling device, for the coupling in or coupling out electromagnetic waves into and respectively out of a transmitting or receiving element for use in telecommunications and data communications, the coupling device having a reflecting surface (8), which is curved, and with at least one locating pad (7, 12, 13) provided for the alignment of a transmitting or receiving element (9, 11), the locating pad and the reflecting surface are one piece, characterised in that the locating pad (7, 12, 13) and the reflecting surface (8) are arranged that the material of which the coupling device consists is not part of the optical path between the transmitting or receiving element (9, 11) and the reflecting surface (8), whereas the curved reflecting surface (8) is shaped, so that a section therethrough has approximately the shape of a section of one of the group of a parabola, hyperbola and an ellipse, with an eccentricity unequal zero.

2. Coupling device according to claim 1, characterised in that the reflecting surface (8) has approximately the shape of a section of a paraboloid of revolution (5), ellipsoid of revolution (10) or hyperboloid of revolution.

3. Coupling device according to claim 1, characterised in that at least one transmitting or receiving element (9, 11) is provided that transmits electromagnetic waves (3, 4) from the reflecting surface (8).

4. Coupling device according to claim 3, characterised in that at least one transmitting or receiving element (9, 11) is arranged in the proximity of a focal point B of the reflecting surface (8).

5. Coupling device according to claim 3, characterised in that at least one transmitting or receiving element (9, 11) is a wave guide.

6. Coupling device according to claim 5, characterised in that the locating pad (7, 12, 13) is configured such that it permits the alignment of a transmitting or receiving element (9, 11) in at least two directions, being substantially perpendicular to one another.

7. Coupling device according to claim 5, characterised in that the locating pad (7, 12, 13) is configured in one piece with the reflecting surface (8).

8. Method for coupling in and coupling out of optical signals into or out of receiving elements including optical fibres, optical wave guides, lenses, mirror optics or systems with gradient index lenses, characterised in that a coupling device according to claim 1 is used.

* * * * *

UNITED STATES PATENT AND TRADEMARK OFFICE
CERTIFICATE OF CORRECTION

PATENT NO. : 7,068,880 B2
APPLICATION NO. : 10/363600
DATED : June 27, 2006
INVENTOR(S) : Ingo Smaglinski It is certified that error appears in the above-identified patent and that said Letters Patent is hereby corrected as shown below:

Column 1, delete the duplicate paragraph, lines 11-15.

Signed and Sealed this

Twelfth Day of September, 2006

JON W. DUDAS
*Director of the United States Patent and Trademark Office*